(12) United States Patent
Bartnick et al.

(10) Patent No.: US 8,794,264 B2
(45) Date of Patent: Aug. 5, 2014

(54) FLUID VALVE PORT OPTIMIZED FOR ROBUSTNESS WITH STANDARD O-RING SEAL

(75) Inventors: Brian K. Bartnick, Ortonville, MI (US); Pablo Valencia, Jr., Northville, MI (US); Corry W Johnson, Orion Township, MI (US); Bill F Tompkins, Troy, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 512 days.

(21) Appl. No.: 13/118,751

(22) Filed: May 31, 2011

(65) Prior Publication Data
US 2012/0305115 A1    Dec. 6, 2012

(51) Int. Cl.
*F16K 5/04*    (2006.01)

(52) U.S. Cl.
USPC .............. 137/625.28; 137/625.32; 251/118; 251/317.01

(58) Field of Classification Search
CPC ... F16K 5/0421; F16K 5/0464; F16K 5/0457; F16K 5/0478; F16K 47/045; Y10S 251/90
USPC ........... 137/625.28, 625.31, 625.32; 251/118, 251/309, 316, 317.01
See application file for complete search history.

(56) References Cited

U.S. PATENT DOCUMENTS

| | | | |
|---|---|---|---|
| 1,122,848 A | 12/1914 | Bloom | |
| 2,051,278 A | 8/1936 | Svenson | |
| 2,547,116 A * | 4/1951 | Gould | 251/309 |
| 2,578,396 A * | 12/1951 | Brown | 251/317 |
| 3,133,723 A | 5/1964 | Goldman et al. | |
| 3,991,975 A | 11/1976 | Sibrava | |
| 3,993,099 A | 11/1976 | Nightingale | |
| RE30,224 E | 3/1980 | Ortega | |
| 4,262,880 A | 4/1981 | Danko et al. | |
| 4,540,025 A * | 9/1985 | Ledeen et al. | 137/625.32 |
| 4,890,817 A * | 1/1990 | Uri | 251/312 |
| 4,958,802 A | 9/1990 | Underwood | |
| 5,037,067 A | 8/1991 | Ray | |
| 5,113,909 A * | 5/1992 | Marin et al. | 137/625.32 |
| 5,152,321 A | 10/1992 | Drager et al. | |
| 5,188,144 A | 2/1993 | Radossi | |
| 5,234,193 A | 8/1993 | Neal, Jr. et al. | |
| 5,327,929 A | 7/1994 | Radossi | |
| 5,511,584 A * | 4/1996 | Leinen | 137/625.3 |
| 5,680,889 A * | 10/1997 | Boger | 137/625.32 |
| 5,771,929 A * | 6/1998 | Boger | 137/625.32 |
| 5,906,297 A | 5/1999 | Cole | |

(Continued)

OTHER PUBLICATIONS

Generic variable flow control valve, believed in use at least since 2010.

(Continued)

*Primary Examiner* — John Fox

(57) ABSTRACT

An optimized fluid valve port has the following features: 1) the seal is preferably a standard O-ring seated in a rectilinear seal channel of one of a first or second valve body, 2) the unsupported span of the O-ring during valve port crossing is limited to a length of less than approximately three O-ring diameters, the support being provided by a web disposed between port openings; and 3), within the area of the O-ring, the fluid flow area of the fluid valve port is maximized.

12 Claims, 9 Drawing Sheets

(56) References Cited

U.S. PATENT DOCUMENTS

| | | | |
|---|---|---|---|
| 5,931,196 | A | 8/1999 | Bernardi et al. |
| 6,575,195 | B2 | 6/2003 | Wichmann |
| 6,874,759 | B2 * | 4/2005 | Aoshima et al. ............. 251/309 |
| 7,044,436 | B2 * | 5/2006 | Corbetta et al. ............. 251/127 |
| 2006/0137536 | A1 | 6/2006 | De Jong |

OTHER PUBLICATIONS

U.S. Appl. No. 13/439,193, filed Apr. 4, 2012; inventors: Brian K. Bartnick and Jr., Corry W. Johnson.

U.S. Appl. No. 13/413,079, filed Mar. 6, 2011; inventors: Pablo Valencia, Jr. and Brian K. Bartnick.

U.S. Appl. No. 13/216,631, filed Aug. 24, 2011; inventors: Brian K. Bartnick and Corry W. Johnson.

Faucet Valve Insert having diagonally disposed O-ring and channel therefor of Moen Incorporated, North Olmstead, OH 44070. Believed on the market at least since 1990.

Generic Prior Art O-Rings and Channels Therefor. Known since at least before 2010.

* cited by examiner

FLUID VALVE PORT OPTIMIZED FOR ROBUSTNESS WITH STANDARD O-RING SEAL

TECHNICAL FIELD

The present invention relates to fluid valve ports and more particularly the seals utilized therewith. Still more particularly, the present invention relates to fluid valve ports configured for optimized use of standard O-rings.

BACKGROUND OF THE INVENTION

Fluid valve mechanisms utilize one or more fluid valve ports for the purpose of controlling flow of a fluid. The fluid valve mechanism includes a first valve body having a first port opening fluidically communicating with a first fluid transfer line (providing for either delivery or removal of the fluid), and further includes a second valve body having a second port opening fluidically communicating with a second fluid transfer line (providing the other of either delivery or removal of the fluid). A motive device (i.e., a motor or actuator) is provided to selectively move the first valve body with respect to the second valve body so as to thereby selectively align the first and second port openings and thereby regulate the fluidic communication therethrough, wherein the selectivity of the alignment ranges typically from a nonaligned state, wherein fluid flow through the first and second port openings is prevented, to a fully aligned state, wherein fluid flow through the first and second port openings is maximally unimpeded.

In order to prevent fluid leakage between the first and second valve bodies, a seal is provided, usually carried by the valve body connected to the fluid delivery line, wherein the seal circumscribes the valve opening thereat. Most commonly, a rubber O-ring is utilized for the seal, wherein the O-ring is seated in a seal channel formed in the valve body carrying the O-ring. Because the O-ring is compressed between a floor of the seal channel and the sidewall of the opposing valve body, a slidable seal is provided by the O-ring which prevents fluid leakage.

Referring now to FIG. 17, shown schematically is a fluid valve mechanism 10 having a conventional, prior art fluid valve port 12. A movable valve body, or "core", 14, has formed therein a seal channel 16 into which is seated an O-ring 18, wherein the O-ring circumscribes a core port opening 20. A stationary valve body, or "manifold", 22, has a manifold port opening 24. Now, referring additionally to FIG. 18, where the O-ring 18 spans the manifold port opening 24, the unsupported span 18' of the O-ring tends to pop out from the seal channel 16, which tendency is exacerbated by stretching and compression forces being applied to the O-ring dynamically as the core rotates with respect to the manifold. This tendency of the O-ring to pop out of its seal channel can result in premature wear, cutting, jamming or otherwise a failure of the seal it provides. In general, for unsupported spans of the O-ring, problems of seating of the O-ring in its seal channel arise for unsupported span lengths exceeding about 3 diameters of the O-ring. A technique known in the prior art to prevent the O-ring from popping out via under cut walls of the seal channel. As seen by way of example in FIG. 19, the core 14' has a seal channel 26 with undercut walls 28, whereby even though an unsupported span 18''' of the O-ring 18'' exists, the O-ring is nonetheless trapped in the seal channel.

While undercut walls prevent the O-ring from popping out of its seal channel, the under cuts require expensive machining and are ordinarily fitted with custom O-rings, which are also expensive as compared with off-the-shelf, standard O-rings. Further, the problem of O-ring pop out from its seal channel is exacerbated by high frequency of opening/closing cycles, long term exposure to wide temperature fluctuations, and age related reduction in O-ring elasticity.

Accordingly, what remains needed in the art is to somehow provide a fluid valve port configured so as to allow a standard O-ring to be retained operably in its seal channel, with minimal wear and without cutting or jamming, wherein the seal channel is of a simple rectilinear shape.

SUMMARY OF THE INVENTION

The present invention is an optimized fluid valve port configured so as to allow a standard O-ring to be retained operably in its seal channel, with minimal wear and without cutting or jamming, wherein the seal channel is of a simple, easily manufactured rectilinear shape.

The optimized fluid valve port according to the present invention has the following features: 1) the seal is preferably a standard O-ring seated in a preferably simple rectilinear shape (i.e., U-shaped) seal channel disposed at one of the first or second valve bodies (i.e., the core or manifold), 2) the unsupported span of the O-ring during valve port crossing is limited to a length of less than approximately three O-ring diameters; and 3), with feature 2) in mind, within the area of the O-ring, the fluid flow area of the fluid valve port is maximized.

The optimized fluid port valve in accordance with the present invention is a component of a fluid valve mechanism having a first valve body and a second valve body which are movable with respect to each other, as for example by an electric motor or an actuator. For each optimized fluid port valve, one of the first and second valve bodies has formed therein a seal channel. An O-ring is seated therein and an first port opening is formed therethrough which is disposed concentrically within the area defined by the O-ring. The other of the first and second valve bodies has a plurality of second port openings formed therethrough which are mutually disposed such that the plurality of second port openings are alignable with the first port opening in response to the movement of the first valve body with respect to the second valve body. The distribution of the second port openings is such that they are mutually separated by a web. In this regard, the web provides support for the O-ring where otherwise the O-ring has an unsupported span during crossing of the first opening with respect to the plurality of second port openings in response to the movement of the first and second valve bodies. Accordingly, the O-ring is critically supported by the web, whereby the unsupported length of the O-ring is not more than about three times the O-ring diameter. Additionally, the optimized fluid port valve in accordance with the present invention is configured to smooth and maximize fluid flow while simultaneously providing support for, and minimizing abrasion of, the O-ring.

Accordingly, it is an object of the present invention to provide an optimized fluid valve port configured so as to allow a standard O-ring to be retained operably in its seal channel, with minimal wear and without jamming, wherein the seal channel is of a simple rectilinear shape.

This and additional objects, features and advantages of the present invention will become clearer from the following specification of a preferred embodiment.

DESCRIPTION OF THE PREFERRED EMBODIMENT

Figure 1:
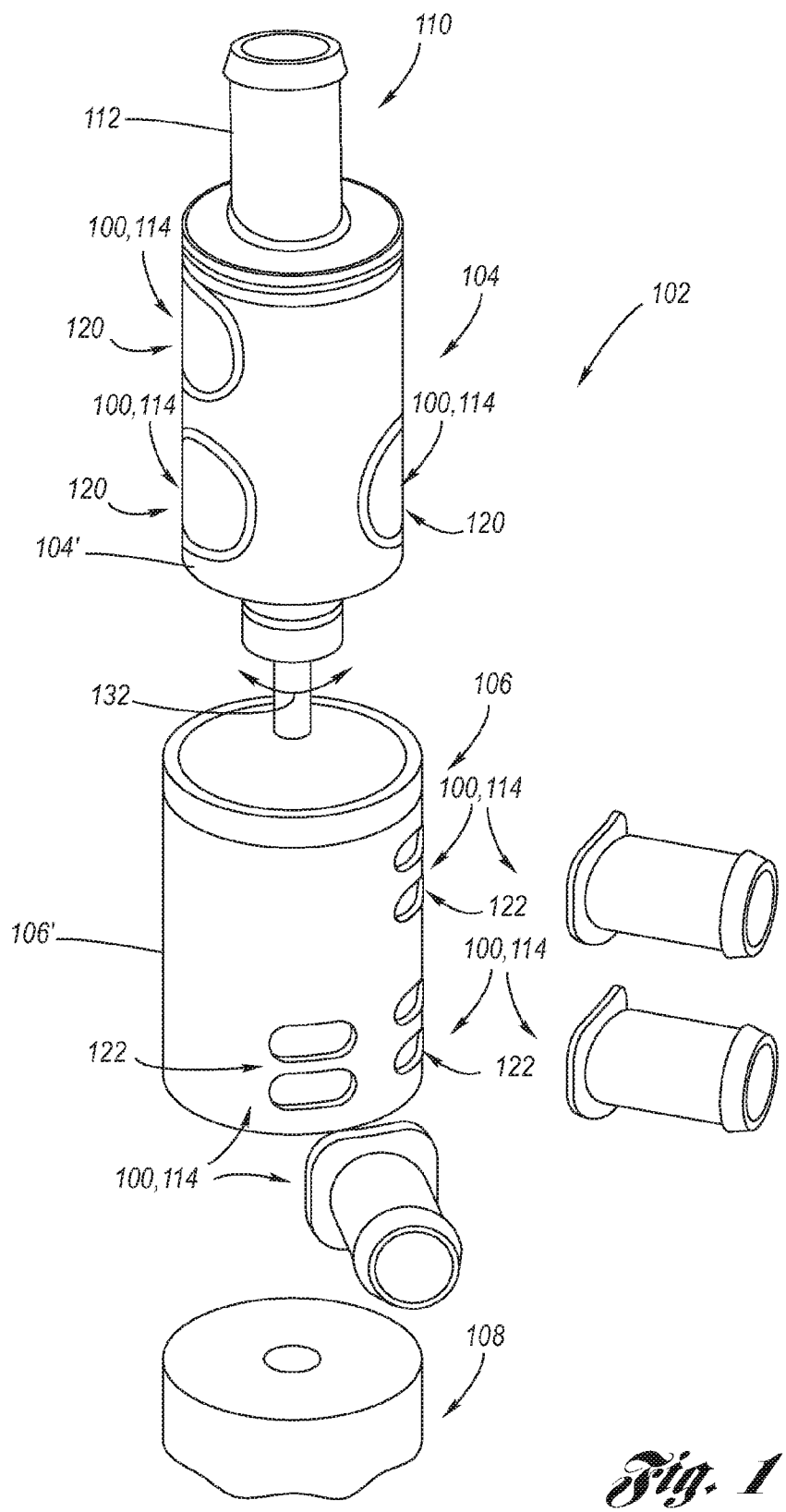
FIG. 1 is an exploded view of an example of a fluid valve mechanism having, by way of example, three optimized fluid valve ports according to the present invention.

Referring now to the Drawing, FIGS. 1 through 16 depict various aspects of an optimized fluid valve port 100 according to the present invention.

Turning attention firstly to FIG. 1, an exploded view of a fluid valve mechanism 102 is depicted, having a first valve body, in this example being a rotatable "core", 104, a second valve body, in this example being a nonrotatable "manifold", 106, and an electric motor 108 for rotating the core with respect to the manifold. An inlet 110 is connected to the core 104, wherein an inlet conduit (not shown, but may be for example a hose) is connectable to an inlet nipple 112 such that fluid from the inlet conduit passes through the inlet nipple to the interior 104' of the core. Merely be way of exemplification, three outlets 114 are provided, each being an optimized fluid valve port 100 in accordance with the present invention.

Each optimized fluid valve port 100 includes a core port 120 at the sidewall 104" of the core 104, and further includes a manifold port 122 at the sidewall 106' of the manifold 106.

Figure 2:
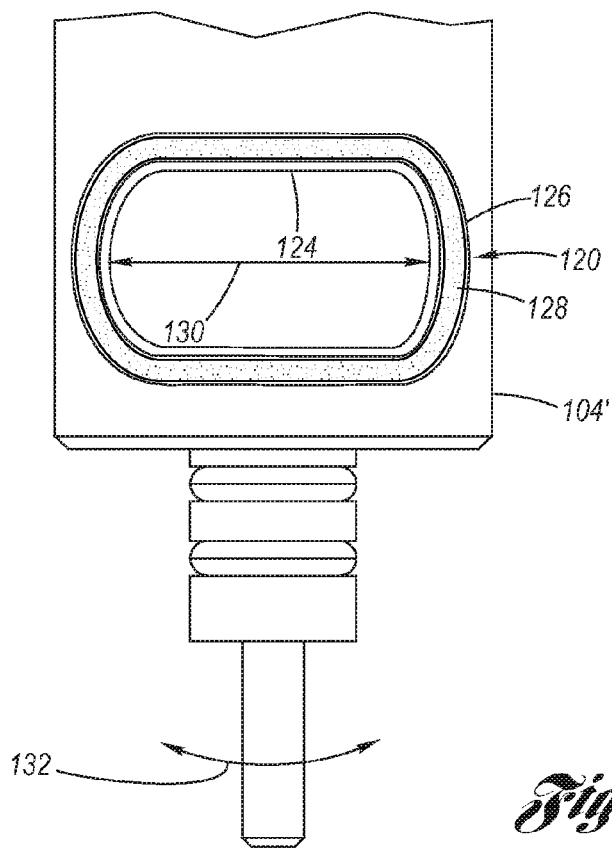
FIG. 2 is a broken-away elevational view of a core of the fluid valve mechanism of FIG. 1.
Figure 3:
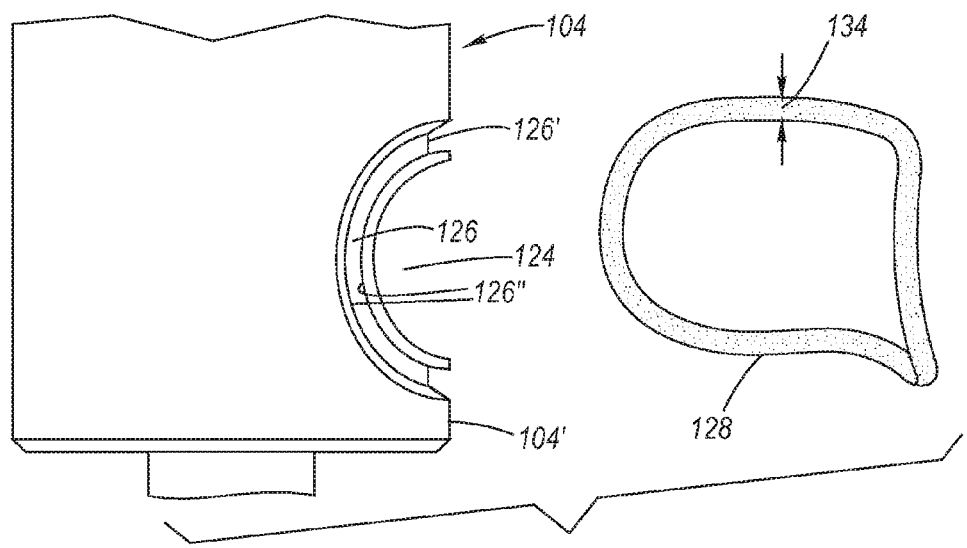
FIG. 3 is an exploded view of the core of the fluid valve mechanism of FIG. 1, showing detail of the O-ring and seal channel into which it is seatable.

As best seen at FIGS. 2 and 3, the core port 120 is characterized by a core opening 124, a seal channel 126 disposed concentrically adjacent the core opening, and an O-ring 128 which is seated in the seal channel. The core opening 124 is preferably oval with longest elongation axis 130 parallel to rotational tangent 132 of the core 104. The O-ring 128 is preferably a standard "off the shelf" O-ring of circular or oval cross-section, defined by an O-ring cross-sectional width 134, and the seal channel 126 is preferably of rectilinear cross-section, i.e., U-shaped, defined by a channel floor 126' and channel sidewalls 126" oriented perpendicular in relation to the channel floor.

Figure 4:
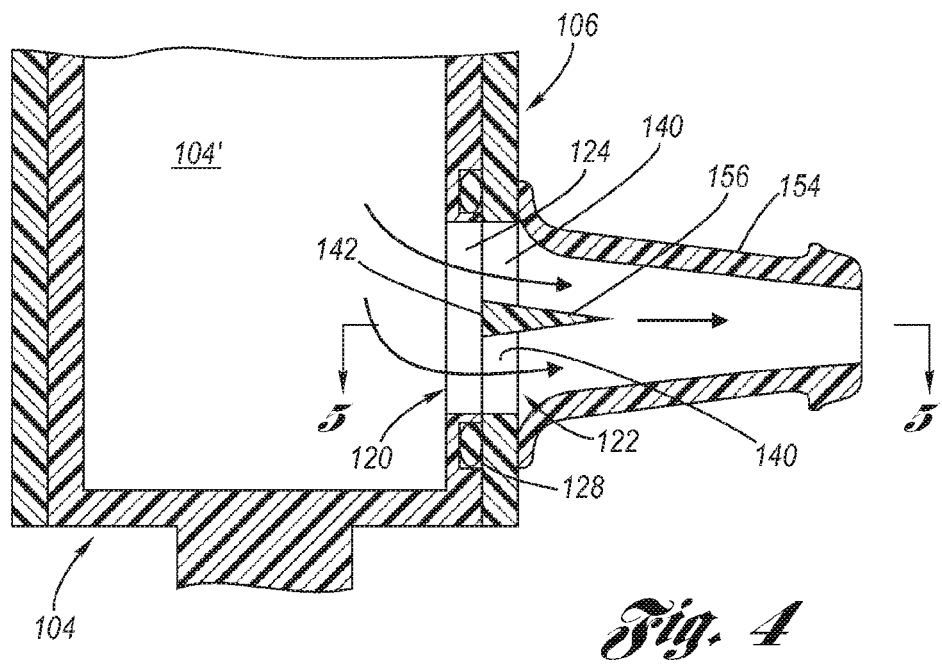
FIG. 4 is a sectional view of an optimized fluid valve port in accordance with the present invention.
Figure 5:
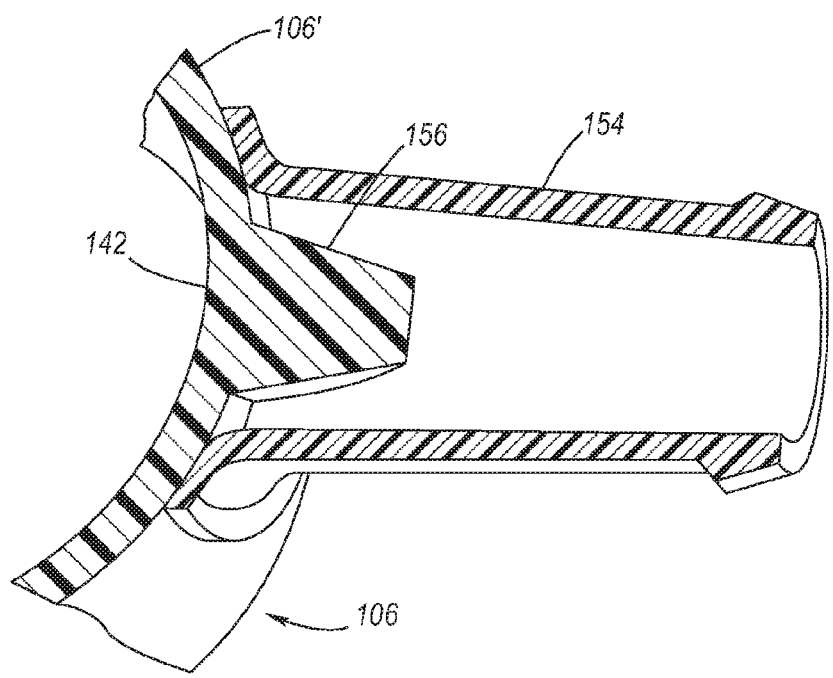
FIG. 5 is a sectional view, seen along line 5-5 of FIG. 4.

Referring now additionally to FIGS. 4 and 5, the manifold port 122 is characterized by a pair of elongated manifold openings 140 which are separated from each other by a web 142. The elongation axis 144 of the manifold openings 140 is parallel to the rotational tangent 132, wherein the web 142 extends parallel to the elongation axis. Preferably, the ends 146 of the manifold openings 140 are rounded, that is, concavely shaped with respect to the opening.

The longitudinal length 148 of the manifold openings 140 along the elongation axis is approximate the length of the opening of the core opening 124 along its longest elongation axis 130. The transverse width 150 of the manifold openings 140 is preferably less than about three times the cross-sectional width 134 of the O-ring 128. The width 152 of the web 142 is predetermined to provide adequate support for the O-ring 128, as will be discussed hereinbelow.

An outlet nipple 154 is attached, in sealing relation, to the sidewall 106' of the manifold 106 in circumscribing relation to the manifold openings 140. Preferably the outlet nipple 154 is tapered, becoming narrowed with increasing distance from the sidewall 106' of the manifold 106, so as to encourage laminar fluid flow therethrough. An outlet conduit (not shown, but for example a hose) is connected to the outlet nipple 154 such that fluid can flow from the interior 104' of the core 104 to the outlet conduit. For the purpose of encouraging laminar flow of the fluid, a fin 156 is preferably formed at the web 142, having a taper such that the width of the fin is smaller with increasing distance from the web.

By way of example, and not limitation, if the core opening 124 has a 20 mm round diameter, then the manifold openings 140 may each have a transverse width 148 of 8 mm and a longitudinal length of 20 mm, and the web 142 may have a width of 2 mm. The fin 156 may have a height above the web 142 of about 4 mm. The outlet nipple 154 may have a taper from 19 mm at the sidewall 106' of the manifold 106 down to 16 mm at its end.

Referring now additionally to FIGS. 6 through 13, operation of the optimized fluid valve port 100 will be detailed, wherein control of fluid flow is provided by the fluid valve mechanism 102 via rotation of the core 104 with respect to the stationary manifold 106.

Figure 6:
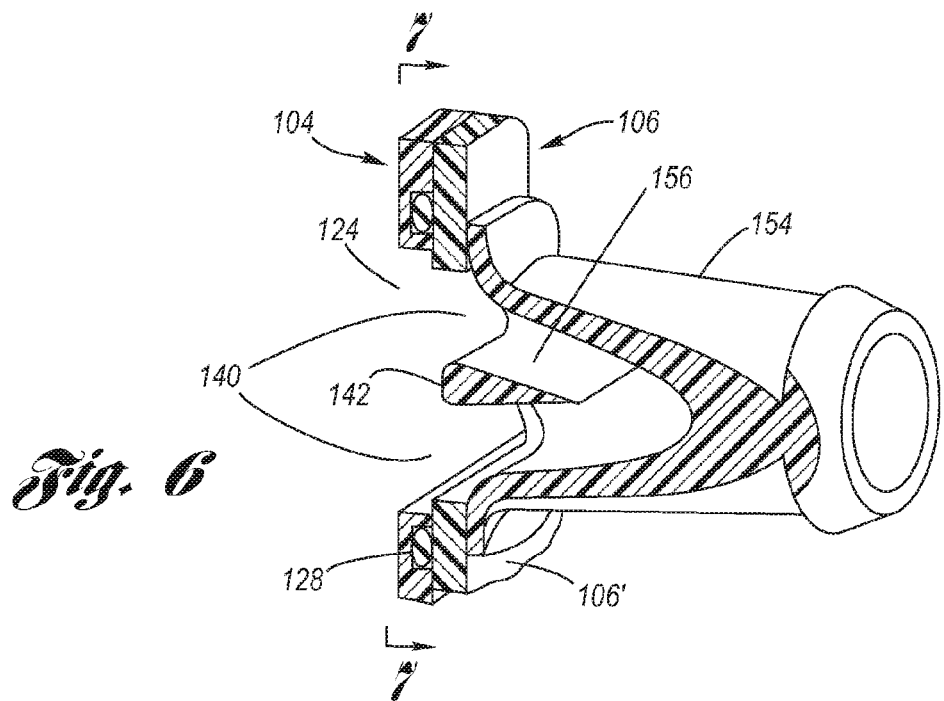
FIG. 6 is a broken-away, sectional view of an optimized fluid valve port in accordance with the present invention, depicted in a fully open state.

As shown at FIGS. 6 though 9, the alignment of the core port 120 with the manifold port 122 allows a maximal flow of fluid entering the core from the inlet nipple 112 and out the outlet nipple 154. In this regard, the O-ring 128 is compressed between the channel floor 126' and the sidewall 106' of the manifold 106, whereby the fluid flow from the core through the outlet nipple is prevented from leaking. The fluid flow freely passes through the manifold openings 140 and the core opening 124 and is kept laminar by action of the fin 156, as well as the taper of the outlet nipple.

Figure 10:
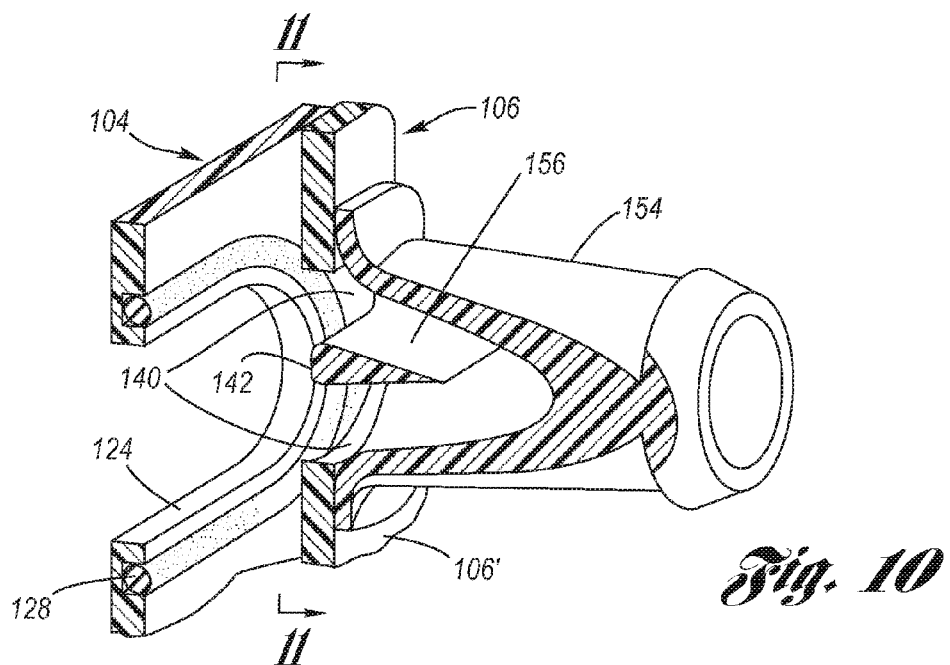
FIG. 10 is a broken-away, sectional view of an optimized fluid valve port in accordance with the present invention, depicted in a partly open state.
Figure 11:
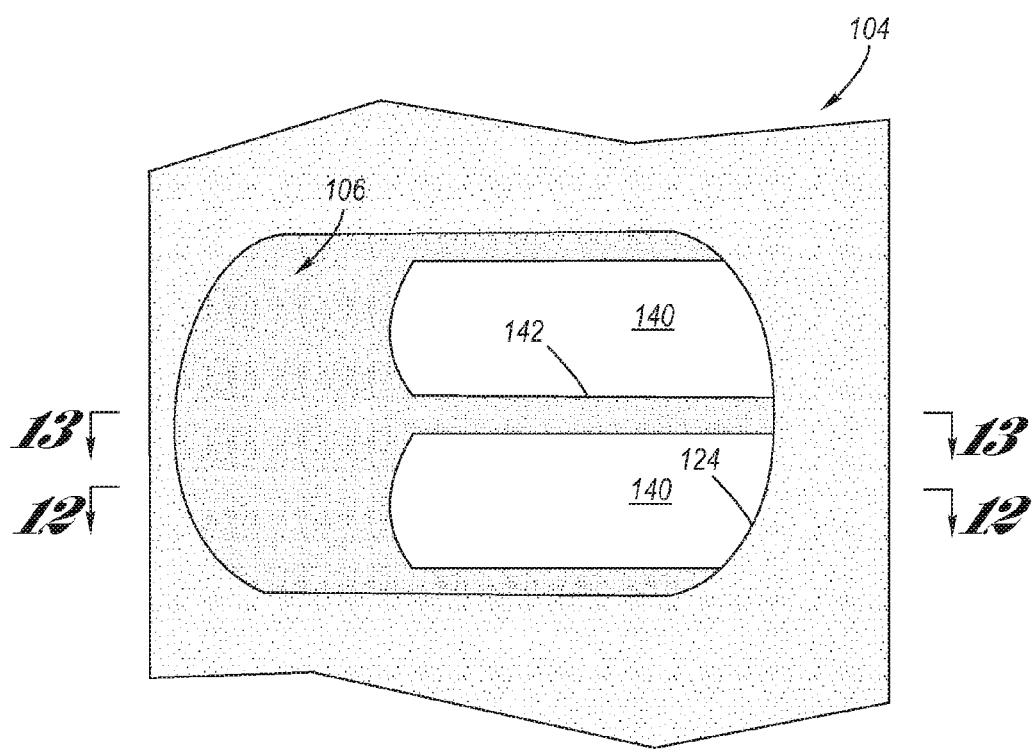
FIG. 11 is a broken-away plan view, seen along line 11-11 of FIG. 10.
Figure 12:
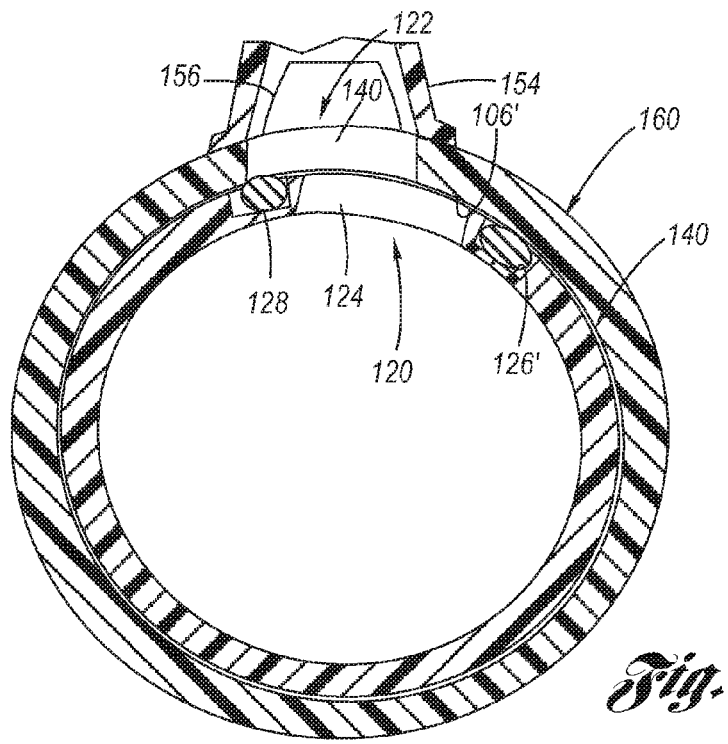
FIG. 12 is a sectional view, seen along line 12-12 of FIG. 11.
Figure 13:
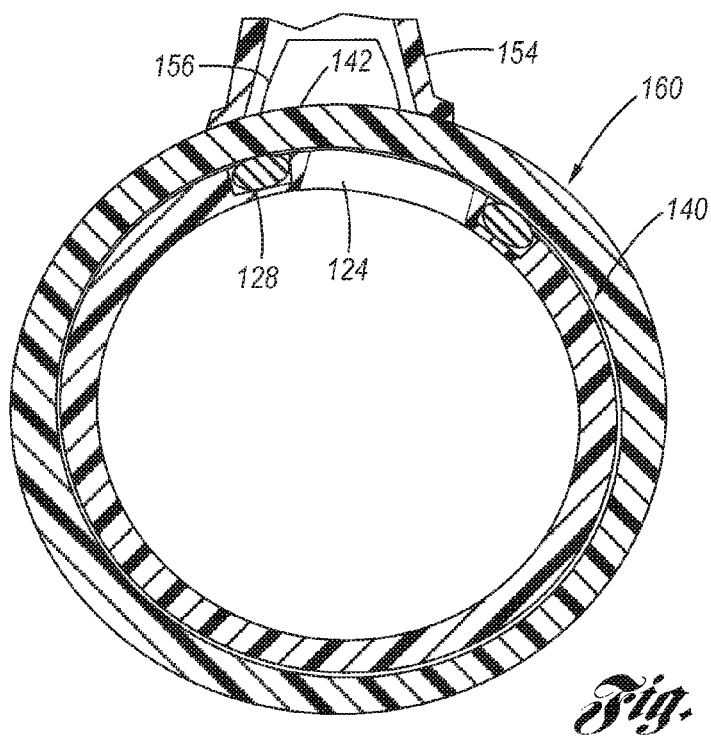
FIG. 13 is a is a sectional view, seen along line 13-13 of FIG. 11.

As shown at FIGS. 10 though 13, the core 104 has rotated with respect to the manifold 106, so that now the core port 120 is only partly aligned with the manifold port 122, whereby fluid flow is somewhat restricted as flow of fluid enters the core from the inlet nipple 112 and out the outlet nipple 154. Again in this regard, the O-ring 128 is compressed between the channel floor 126' and the sidewall 106' of the manifold 106, whereby the fluid flow from the core through the outlet nipple is prevented from leaking. However, now a pair of unsupported spans 170 of the O-ring exist. As shown best at FIGS. 10 and 13, the web 142 abuts the O-ring such that the length of each unsupported span 170 is not longer than about three times the cross-section (diameter) of the O-ring. The fluid flow freely passes through the manifold openings 140, albeit now of a reduced diameter, and is kept laminar by action of the fin 156, as well as the taper of the outlet nipple. As such, provided is an optimized fluid valve port configured so as to allow a standard O-ring to be retained operably in its seal channel, with minimal wear and without jamming, wherein the seal channel is of a simple rectilinear shape.

Figure 14:
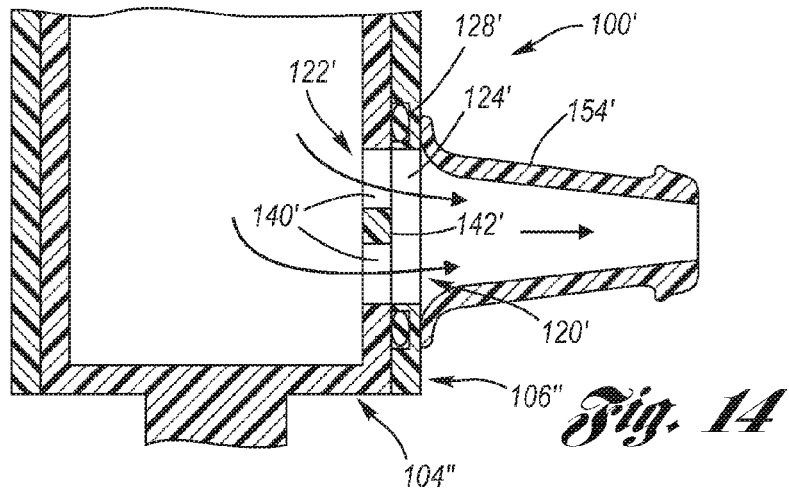
FIG. 14 is a broken-away, sectional view of an optimized fluid valve port in accordance with the present invention, now configured oppositely with respect to the configuration of FIG. 2.
Figure 15:
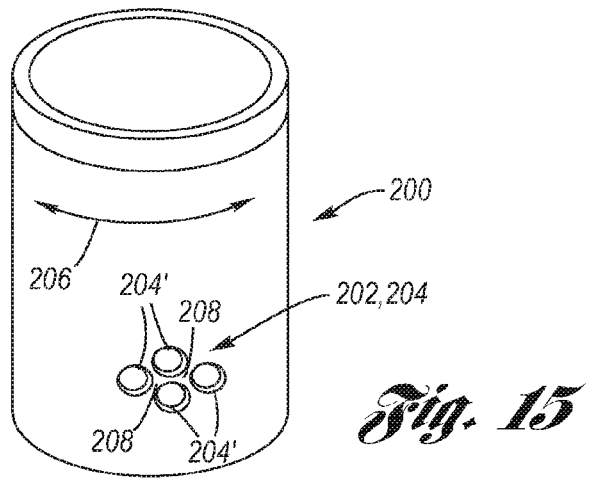
FIG. 15 is a perspective view of a second valve body having a first alternate configuration of the plurality of second port openings.
Figure 16:
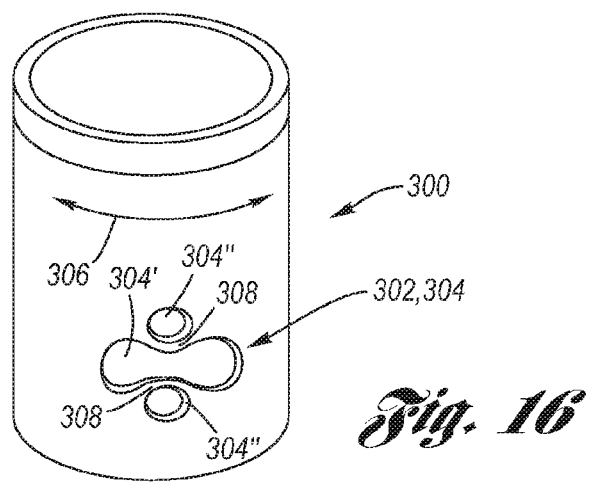
FIG. 16 is a perspective view of a second valve body having a second alternate configuration of the plurality of second port openings.
Figure 17:
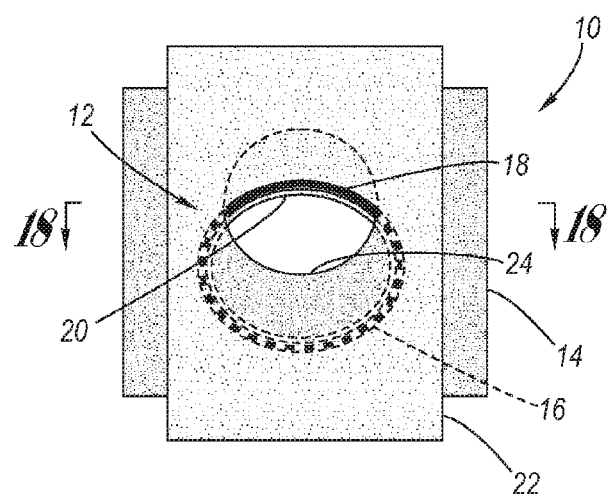
FIG. 17 is a schematic view of a prior art valve port with prior art seal, depicted in a partly open state.
Figure 18:
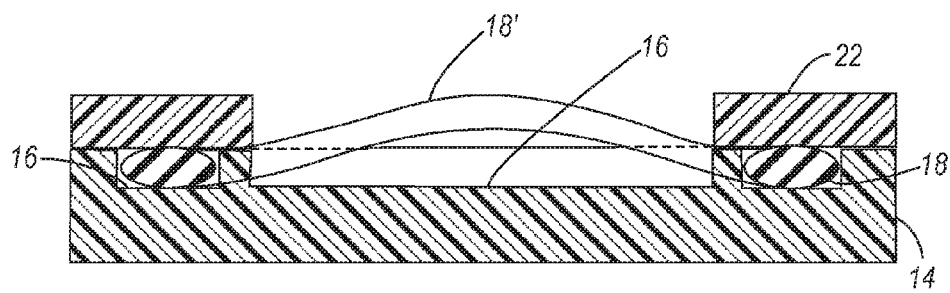
FIG. 18 is a sectional view, seen along line 18-18 of FIG. 17.
Figure 19:
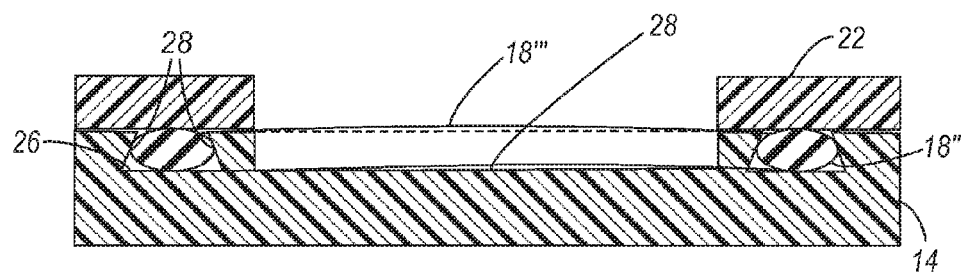
FIG. 19 is a sectional view as in FIG. 18 of a prior art valve port including under cut walls of the seal channel trapping therein the prior art O-ring seal.

While the embodiment of FIGS. 1 through 13 is preferred, referring now to FIGS. 14 through 16, alternate embodiments are depicted.

Figure 7:
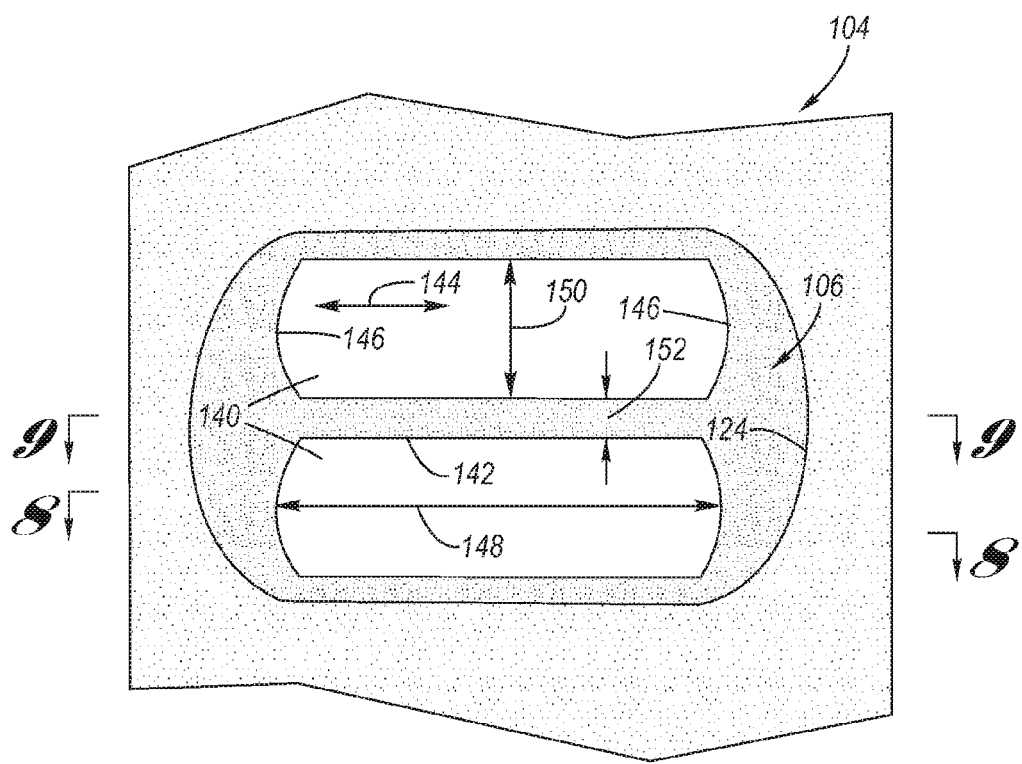
FIG. 7 is a broken-away plan view, seen along line 7-7 of FIG. 6.
Figure 8:
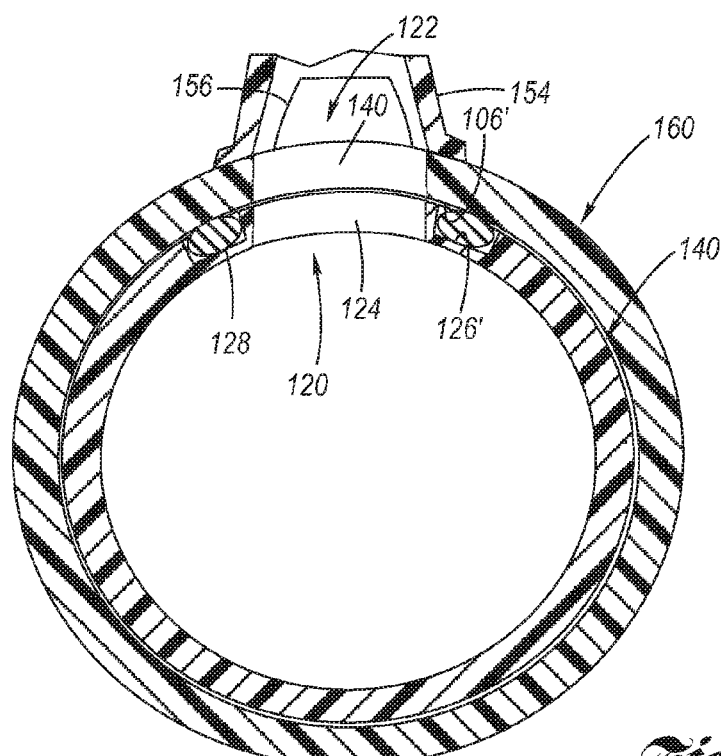
FIG. 8 is a sectional view, seen along line 8-8 of FIG. 7.
Figure 9:
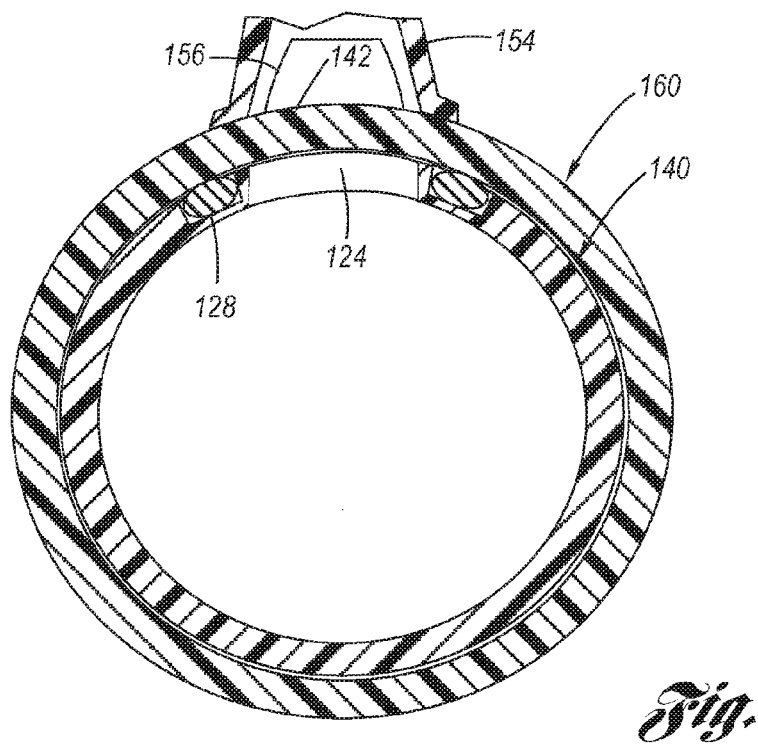
FIG. 9 is a is a sectional view, seen along line 7-7 of FIG. 7.

At FIG. 14 a fluid valve mechanism 100' is depicted in which the core and manifold port configurations are reversed with respect to the fluid valve mechanism 100. The core port 122' is characterized by a pair of core openings 140' formed in the sidewall of the core 104", elongated in the manner as depicted at FIG. 7. A web 142' is disposed between the core openings 140'. The manifold port 120' is characterized by a manifold opening 124'. A tapering outlet nipple 154' is connected, in sealing relation, to the sidewall of the manifold 106".

At FIG. 15, the manifold 200 of a fluid valve mechanism has a manifold port 202 characterized by plurality of manifold openings 204 in the form of four circular openings 204'. An outlet nipple (not shown, but similar to that shown at FIG. 14) is connected to the sidewall 200' of the manifold 200. The manifold openings 204 have a generally elongated arrangement parallel to the rotational tangent 206 of the core (not shown), wherein the space separating the openings 204' forms a web 208 which provides abutment to the O-ring (not shown, but similar that that shown in FIG. 3) at the otherwise unsupported span thereof. Again, the unsupported span length is less than about three times the cross-section (diameter) of the O-ring.

As the core rotates, all the openings 204' can pass fluid, some of the openings can pass fluid, only one opening can pass fluid, a portion of one opening can pass fluid, or the or no openings can pass therethrough fluid. Advantages of the arrangement of manifold openings 204 over the manifold openings 140 include: easier assembly, simpler manufacture by drilling, as opposed to milling (end mill plunge and traverse) of the manifold openings 140, greater precision of flow control due to the relatively smaller openings 204'; however, disadvantages include lower flow area of the manifold openings 204 as compared to the manifold openings 140, the embodiment of FIG. 15 has more edge wear than the embodiments of FIGS. 1 through 14, and the embodiment of FIG. 15 has an absence of a fin. By way of example, teach opening 204' may have a cross-section of 6.5 mm, and the web 208 about 2 mm wide.

At FIG. 16, the manifold 300 of a fluid valve mechanism has a manifold port 302 characterized by plurality of manifold openings 304 in the form of a central saddle shaped opening 304' and on either side a smaller circular opening 304". An outlet nipple (not shown, but similar to that shown at FIG. 14) is connected to the sidewall 300' of the manifold 300. The saddled shaped opening 304' is elongated parallel to the rotational tangent 306 of the core (not shown), wherein the space separating the openings 304', 304" forms a web 308 which provides abutment to the O-ring (not shown, but similar that that shown in FIG. 3) at the otherwise unsupported span thereof. Again, the unsupported span length is less than about three times the cross-section (diameter) of the O-ring.

As the core rotates, all the openings 304', 304" can pass fluid, some of the openings can pass fluid, only one opening 304" can pass fluid, a portion of one opening can pass fluid, or the or no openings can pass therethrough fluid. Advantages of the arrangement of manifold openings 304 over the manifold openings 140 include: higher fluid flow capability; however, disadvantages include more difficult to assemble, more difficult to manufacture, has more edge wear than the embodiments of FIGS. 1 through 14, and the embodiment of FIG. 16 has an absence of a fin.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A fluid port valve interfaced with first and second valve bodies which are movable with respect to each other, said fluid port valve comprising:
   a first valve port formed in the first valve body, said first valve port comprising:
      a first port opening formed in the first valve body;
      a seal channel formed in said first valve body circumscribing said first port opening; and
      an O-ring seated in said seal channel, said O-ring having an O-ring cross-section; and
   a second valve port formed in the second valve body, said second valve port comprising:
      a pair of elongated second port openings formed in the second valve body and elongated along an elongation axis;
      a web formed in a spacing between said pair of second port openings, said web being disposed between said elongated second port openings in parallel relation to said elongation axis; and
      a fin connected with said web;
   wherein when the first and second valve bodies are moved relative to one another, said first and second valve ports are selectively alignable with each other; and
   wherein when said O-ring is disposed at any port opening of said plurality of second port openings, said web provides support for said O-ring such that an unsupported span of said O-ring has a length less than substantially three times said O-ring cross-section.

2. The fluid valve port of claim 1, wherein said elongation axis is parallel to a tangent of movement of the first and second valve bodies with respect to each other.

3. The fluid valve port of claim 2, further comprising a nipple connected with the second valve body in circumscribing relation to said plurality of elongated second port openings, wherein said nipple tapers with increasing distance from said second valve body, and wherein said fin is disposed in said nipple.

4. The fluid valve port of claim 1, wherein said seal channel is rectilinear.

5. A fluid port valve interfaced with first and second valve bodies which are movable with respect to each other, said fluid port valve comprising:
   a first valve port formed in the first valve body, said first valve port comprising:
      a first port opening formed in the first valve body;
      a seal channel formed in said first valve body circumscribing said first port opening; and an O-ring seated in said seal channel, said O-ring having an O-ring cross-section; and
a second valve port formed in the second valve body, said second valve port comprising:
a plurality of second port openings formed in the second valve body; and
a web formed in a spacing between said plurality of second port openings;
wherein when the first and second valve bodies are moved relative to one another, said first and second valve ports are selectively alignable with each other;
wherein when said O-ring is disposed at any port opening of said plurality of second port openings, said web provides support for said O-ring such that an unsupported span of said O-ring has a length less than substantially three times said O-ring cross-section; and
wherein said second valve port further comprises:
said plurality of second port openings comprising a generally saddle shaped port opening having on either side a substantially circular port opening; and
said web being disposed between said second port openings.

6. The fluid valve port of claim 5, wherein said generally saddle shaped port opening is elongated parallel to a tangent of movement of the first and second valve bodies with respect to each other.

7. The fluid valve port of claim 5, further comprising a nipple connected with the second valve body in circumscribing relation to said plurality of second port openings, wherein said nipple tapers with increasing distance from said second valve body.

8. The fluid valve port of claim 5, wherein said seal channel is rectilinear.

9. A fluid valve mechanism, comprising:
a first valve body;
a second valve body, wherein said first and second valve bodies are movable with respect to each other; and
a fluid port valve comprising:
a first valve port formed in said first valve body, said first valve port comprising:
a first port opening formed in said first valve body;
a seal channel formed in said first valve body circumscribing said first port opening; and
an O-ring seated in said seal channel, said O-ring having an O-ring cross-section; and
a second valve port formed in said second valve body, said second valve port comprising:
a pair of elongated second port openings formed in the second valve body and elongated along an elongation axis;
a web formed in a spacing between said pair of second port openings, said web being disposed between said elongated second port openings in parallel relation to said elongation axis; and
a fin connected with said web;
wherein when said first and second valve bodies are moved relative to each other, said first and second ports are selectively alignable with each other;
wherein when said O-ring is disposed at any port opening of said plurality of second port openings, said web provides support for said O-ring such that an unsupported span of said O-ring has a length less than substantially three times said O-ring cross-section; and
wherein said elongation axis is parallel to a tangent of movement of the first and second valve bodies with respect to each other.

10. The fluid valve mechanism of claim 9, wherein said first valve body comprises a core, and said second valve body comprises a manifold.

11. The fluid valve mechanism of claim 10, further comprising a nipple connected with the second valve body in circumscribing relation to said plurality of second port openings, wherein said nipple tapers with increasing distance from said second valve body, and wherein said fin is disposed in said nipple.

12. The fluid valve mechanism of claim 11, wherein said seal channel is rectilinear.

\* \* \* \* \*